United States Patent [19]

Scharpenberg

[11] Patent Number: 4,777,011
[45] Date of Patent: Oct. 11, 1988

[54] METHOD AND DEVICE FOR CHECKING THE DIMENSIONS OF A FUEL ASSEMBLY FOR NUCLEAR REACTORS

[75] Inventor: Rainer Scharpenberg, Wald-Michelbach, Fed. Rep. of Germany

[73] Assignee: Brown, Boveri Reaktor GmbH, Mannheim, Fed. Rep. of Germany

[21] Appl. No.: 936,130

[22] Filed: Dec. 1, 1986

[30] Foreign Application Priority Data

Nov. 29, 1985 [DE] Fed. Rep. of Germany ....... 3542204

[51] Int. Cl.$^4$ .......................................... G21C 17/06
[52] U.S. Cl. .................................. 376/245; 33/533; 73/104
[58] Field of Search ............. 33/143 L, 147 L, 172 E, 33/533; 73/104, 105; 376/245, 249, 252, 258

[56] References Cited

U.S. PATENT DOCUMENTS

| 3,433,058 | 3/1969 | Tobin, Jr. et al. ...................... 73/105 |
| 3,470,739 | 10/1969 | Takafuji et al. ......................... 73/105 |
| 4,048,009 | 9/1977 | Weilbacher .............................. 33/533 |
| 4,280,354 | 7/1981 | Wheeler et al. ......................... 73/105 |
| 4,377,911 | 3/1983 | Iida et al. . |
| 4,464,332 | 8/1984 | Boisseuil et al. . |
| 4,517,152 | 5/1985 | Pieper et al. .......................... 376/252 |
| 4,569,230 | 2/1986 | Asty et al. ............................. 376/252 |
| 4,637,912 | 1/1987 | Scharpenburg et al. ........... 376/245 |
| 4,645,634 | 2/1987 | Roseveare ............................. 376/252 |

FOREIGN PATENT DOCUMENTS

| 0053066 | 11/1981 | European Pat. Off. . |
| 0081747 | 6/1983 | European Pat. Off. ............ 376/252 |
| 2541497 | 12/1983 | France . |
| 2558631 | 7/1976 | Fed. Rep. of Germany . |
| 3149362 | 6/1983 | Fed. Rep. of Germany . |

Primary Examiner—Deborah L. Kyle
Assistant Examiner—Richard W. Wendtland
Attorney, Agent, or Firm—Herbert L. Lerner; Laurence A. Greenberg

[57] ABSTRACT

A method for checking the dimensions of a nuclear reactor fuel assembly in a water tank uses two mutually parallel probes each having a first probe side carrying an ultrasonic test head at a free end thereof with acoustic directions directed towards each other and each having a second probe side facing away from the ultrasonic test head. The acoustic waves are transmitted with one of the ultrasonic test heads, the transmitted acoustic waves are received with the other ultrasonic test head, one of the second probe sides is brought into contact with a given region of the fuel assembly to be checked, the probes are moved towards each other in the direction of the acoustic waves due to contact pressure with the fuel assembly, the probe movement is indicated and assessed by a reduction of transit time of the acoustic waves between the test heads, and the actual dimension of the fuel assembly region to be checked is derived while accounting for the dimension of probe movement.

2 Claims, 2 Drawing Sheets

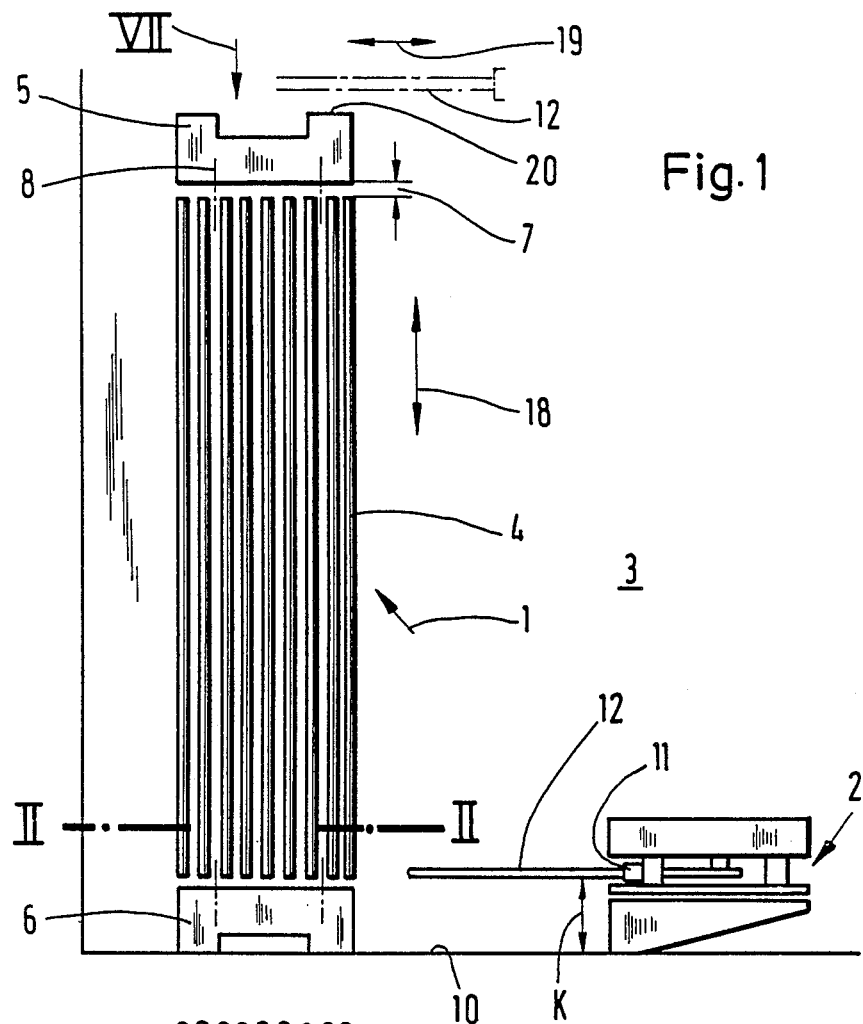
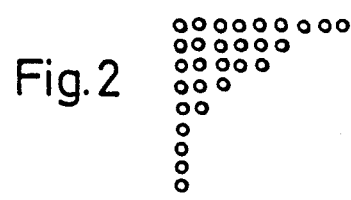
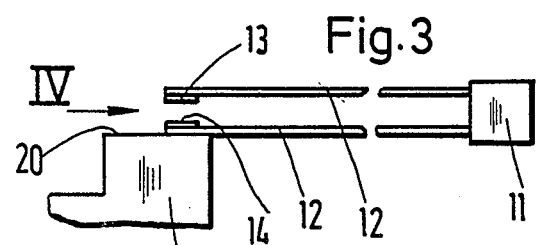
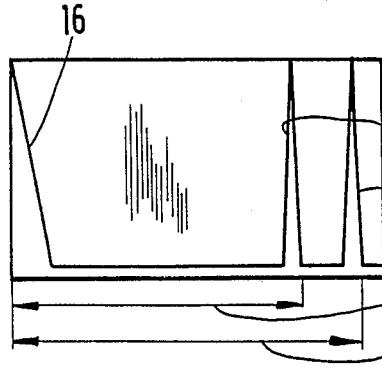
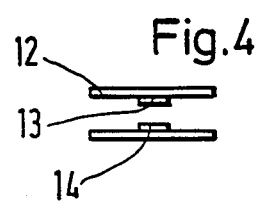

METHOD AND DEVICE FOR CHECKING THE DIMENSIONS OF A FUEL ASSEMBLY FOR NUCLEAR REACTORS

The invention relates to a method for checking the dimensions of a nuclear reactor fuel assembly in a water tank, with two mutually parallel probes carrying ultrasonic test heads which are disposed at the free ends thereof, which have acoustic direction directed towards each other and which are movable relative to the fuel assembly, one ultrasonic test head emitting the acoustic waves and the other ultrasonic test head receiving the emitted acoustic waves.

Such a method is known from Published European Application No. 0 080 418. In that method the spacing between two fuel rods is determined by means of the pulse/echo method. For this purpose an arm equipped with a transmitting/receiving test head is led past two oppositely situated fuel assembly sides. The echos returning from the fuel rods of the outer row of fuel rods are analyzed in relation to their transit time and provide information on the position of the fuel rods relative to one another or to a normal axis. One of the ultrasonic test heads is used as a transmitter and the other as a receiver, solely as a correction for the temperature-dependent propagation velocity in water.

In contrast to this, it is an object of the invention to provide a method and device for checking the dimensions of a fuel assembly for nuclear reactors, which overcomes the hereinafore-mentioned disadvantages of the heretofore-known devices of this general type and by means of which the outer contours of a fuel assembly can be measured.

With the foregoing and other objects in view there is provided, in accordance with the invention, a method for checking the dimensions of a nuclear reactor fuel assembly in a water tank, with two mutually parallel probes each having a first probe side carrying an ultrasonic test head at a free end thereof with acoustic directions directed towards each other and each having a second probe side facing away from the ultrasonic test head, which comprises transmitting acoustic waves with one of the ultrasonic test heads, receiving the transmitted acoustic waves with the other ultrasonic test head, bringing one of the second probe sides into contact with or placement near a given region of the fuel assembly to be checked, moving the probes towards each other in the direction of the acoustic waves due to contact pressure with the fuel assembly, indicating and assessing or determining the probe movement by a reduction of transit time of the acoustic waves between the test heads, and deriving the actual dimension of the fuel assembly region to be checked while accounting for or considering the dimension of probe movement.

A precise measurement of the fuel assembly parts is achieved and damage to the fuel assembly is avoided through the combination of an elastic stop or guide with an indicator of the point in time of contact and of the deflection of the finger of the guide or stop.

In order to carry out the method, there is provided a device for checking the dimensions of a nuclear reactor fuel assembly in a water tank, comprising two mutually parallel probes having free ends, first probe sides facing toward each other and second probe sides facing away from each other, ultrasonic test heads each being disposed on a respective one of the first probe sides at the free end of one of the probes, the ultrasonic test heads having acoustic directions directed towards each other, one of the ultrasonic test heads transmitting acoustic waves and the other of the ultrasonic test heads receiving the transmitted acoustic waves, a feeler or sensor disposed on one of the second probe sides, a roller connected to the feeler, means for bringing the roller into contact with a given region of the fuel assembly to be checked causing the probes to be moved closer together in the direction of the acoustic waves due to contact pressure with the fuel assembly, means for indicating and assessing movement of the probes by a reduction of transit time of the acoustic waves between the test heads, and means for deriving the actual dimension of the given fuel assembly region to be checked while accounting for dimensions of movement of the probes.

In addition to a gentle treatment of the fuel assembly surface, the roller construction provides the possibility of checking a fuel assembly region for alignment deviations.

Other features which are considered as characteristic for the invention are set forth in the appended claims.

Although the invention is illustrated and described herein as embodied in a method and device for checking the dimensions of a fuel assembly for nuclear reactors, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

FIG. 1 is a diagrammatic front-elevational view of a fuel assembly and a manipulator for moving probes;

FIG. 2 is a cross-sectional view of the fuel assembly taken along the line II—II in FIG. 1;

FIG. 3 is a fragmentary, enlarged, front-elevational view of a pair of ultrasonic probes:

FIG. 4 is a side-elevational view taken along the direction of an arrow IV in FIG. 3;

FIG. 5 is a representation of a pulse evaluation on a display screen;

Figure 6:
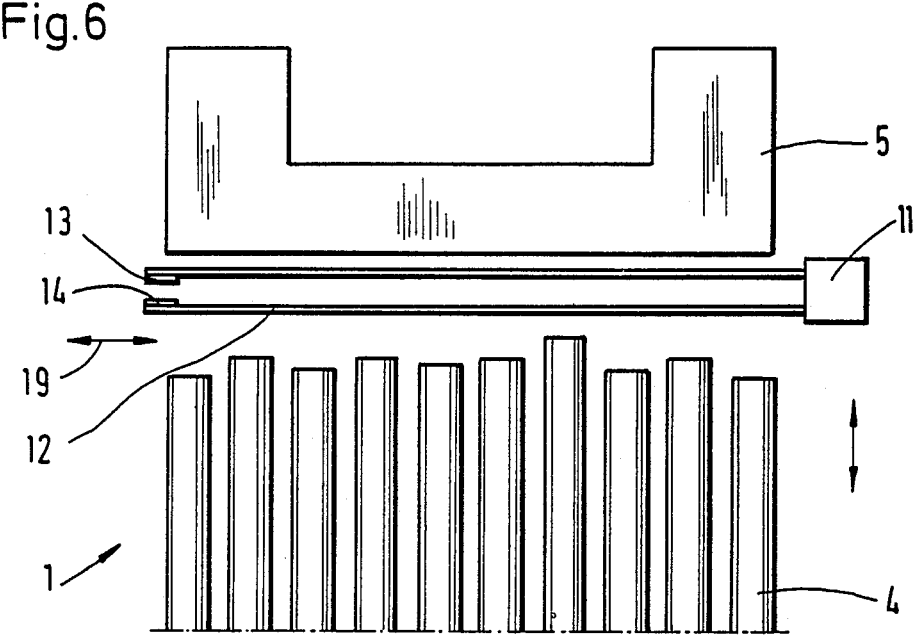
FIG. 6 is an enlarged front-elevational view of a subregion of a fuel assembly.

Referring now to the figures of the drawings in detail and first, particularly, to FIG. 1 thereof, there is seen a fuel assembly 1 which is disposed in a water tank 3, together with a manipulator 2. Several fuel rods 4 form a fuel rod bundle which is disposed between two end plates 5, 6, leaving a spacing 7 between the end plates 5, 6 and the end of a fuel rod. Tie rods 8 fix the end plates 5, 6 in position relative to each other. Non-illustrated spacers provide for the guidance of the fuel rods and for the maintenance of the required gaps between the fuel rods. The manipulator 2 as well as the fuel assembly are supported on a base 10 of the water tank 3. The manipulator has a carrier 11 in which two probes 12 are held. As is evident, in particular from FIGS. 3 and 4, the probes are formed of a resiliently constructed flat material which has a cross-section of approximately $20 \times 1$ mm. The probes are mutually parallel and the wide sides thereof extend roughly parallel to the base 10 of the water tank 3. The probes 12 project from the carrier 11 at least as far as the width of a fuel assembly when considered in cross-section. Ultrasonic test heads 13, 14 are disposed at the free ends of the probes, on the lateral faces which are directed towards each other. The ultrasonic test heads are situated opposite each other and are spaced apart from each other by approximately 10 mm. One ultrasonic test head 13 is constructed as a transmitter and the other ultrasonic test head 14 is constructed as a receiver. Since the the test heads are disposed in water, the transit time of the transmitted pulse over a water path to the receiving test head 14 is a quantity which depends on the spacing of the test heads with respect to each other. The display screen portion illustrated in FIG. 5 shows the transit time 15 of the transmitted pulse 16 after traversing the water path between the ultrasonic test heads 13 and 14. The end of the transit time is clearly shown by a peak or amplitude 17.

If it is intended to check whether or not the fuel assembly has grown in its overall length during insertion or residence in the nuclear reactor, the actual fuel assembly length is determined as follows. After an appropriate travelling movement of the manipulator 2 in the direction of arrows 18 and 19, the wide side of a probe 12 facing away from the ultrasonic test head 14 slowly approaches and is brought into contact with an end surface 20 of the end plate 5. The phantom illustration of the pair of probes 12 indicates the path in the direction of the arrow 18 past the height of the end surface 20 and the subsequent movement in the direction of the arrow 19. It is only then that the opposite movement takes place until contact is made with the end surface 20 of the end plate 5. The representation of the guide and drive elements of the manipulator 2 have been dispensed with for reasons of improved clarity. Due to the resilient construction of the probes 12, after contact has been made, a spacing dimension will be established between the two probes which is smaller than the spacing in a probe that is not brought into contact. The spacing dimension which is established can be seen on the display screen, as calibrated in millimeters in FIG. 5. The end of a reduced transit time 9 of the transmitted pulse 16 after traversing the smaller spacing between the probes 12 is shown by a peak or amplitude 21. The actual length dimension of the fuel assembly is made up of a constant dimension "k" between the base 10 of the water tank 3 and the wide side of the probe 12 with the manipulator 2 disposed on the base 10, plus the path of travel of the manipulator until contact is made by the wide side of the probe with the end surface 20 of the end plate 5, minus the difference between the transit times 9 and 15 which, according to the display screen portion of FIG. 5, is 1 millimeter.

In FIG. 6 the upper end region of a fuel assembly 1 according to FIG. 1 is shown on a larger scale. During the operation of a reactor plant, the individual fuel rods 4 undergo a varying change in length. In a repetitive check taking place at regular spacings, the spacing between the fuel rod with the greatest elongation and the end plate 5 can be determined. For this purpose, the probe pair is inserted into the gap between the end plate 5 and the fuel rod ends in the direction of the arrow 19 while maintaining as small a spacing as possible from the lower surface of the end plate 5. After the probes have been inserted over the entire fuel assembly width, they are moved in the direction of the end plate 5. The process of approach can be expediently followed using the display screen. A reduction of the transit time of the ultrasonic signals between the transmitting and receiving test heads 13, 14 indicates contact with the end plate 5. The path of travel of the probes 12 in the direction of the fuel rod ends at the point of contact with the fuel rod having the largest elongation and is equal to the spacing dimension. The reduction in the transit time of the acoustic pulses between the ultrasonic test heads in this embodiment serves as a visible indication of the process of contact between the side of the probe facing away from the ultrasonic test head 13, 14 and the end plate 5 or a fuel rod end.

Figure 7:
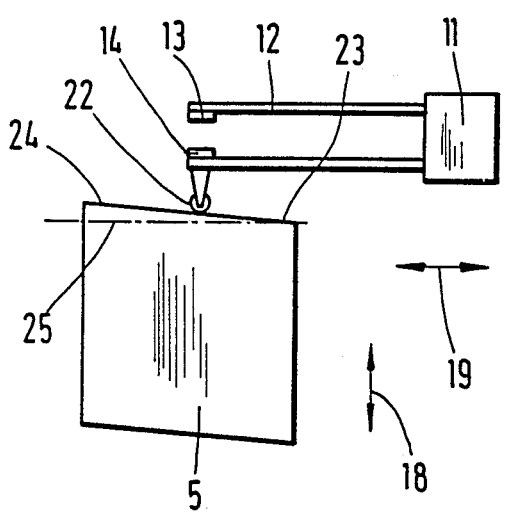
FIG. 7 is a top-plan view taken along the direction of an arrow VII in FIG. 1, showing a special probe construction and an end plate.
Figure 8:
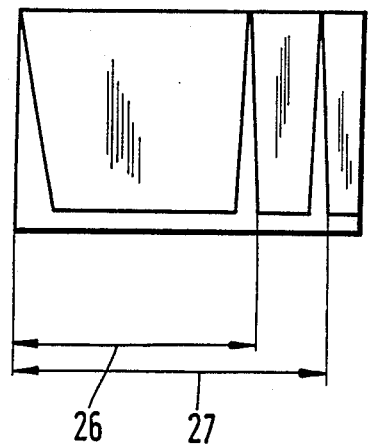
FIG. 8 is a representation of acoustic pulses on a display screen for a probe according to FIG. 7.

FIG. 7 illustrates the application of the method for checking a deviation in alignment of an end plate 5, 6. In this case, a feeler or sensor which is constructed in the form of a roller 22, is associated with the side of the probe facing away from the ultrasonic test haad 14. FIG. 7 shows a view of the end plate 5 in the direction of the arrow VII in FIG. 1, with probes rotated through 90 degrees with respect to the device shown in FIG. 1. By bringing the roller 22 into contact at a position 23 and then at a position 24, the transit time of the transmitted pulse from the transmitting test head 13 to the receiving test head 14 is used to determine which position is nearer to a construction or alignment line 25. The difference between transit times 26 and 27 can be read off directly in millimeters on a display screen in FIG. 8. If necessary, the profile of the deviation from the construction line 25 between the positions 23 and 24 can also be documented by continuously moving the probe carrier 11 in the direction of the arrow 19.

The foregoing is a description corresponding in substance to German Application No. P 35 42 204.1-33, dated Nov. 29, 1985, the International priority of which is being claimed for the instant application, and which is hereby made part of this application. Any material discrepancies between the foregoing specification and the aforementioned corresponding German application are to be resolved in favor of the latter.

I claim:

1. Method for checking the dimensions of a nuclear reactor fuel assembly in a water tank, with two mutually parallel probes each having a first probe side carrying an ultrasonic test head at a free end thereof with acoustic directions directed towards each other and each having a second probe side facing away from the ultrasonic test head, which comprises transmitting acoustic waves with one of the ultrasonic test heads, receiving the transmitted acoustic waves with the other ultrasonic test head, bringing one of the second probe sides into contact with a given region of the fuel assembly to be checked, moving the probes towards each other in the direction of the acoustic waves due to contact pressure with the fuel assembly, indicating and assessing the probe movement by a reduction of transit time of the acoustic waves between the test heads, and deriving the actual dimension of the fuel assembly region to be checked while accounting for the dimension of probe movement.

2. Device for checking the dimensions of a nuclear reactor fuel assembly in a water tank, comprising two mutually parallel probes having free ends, first probe sides facing toward each other and second probe sides facing away from each other, ultrasonic test heads each being disposed on a respective one of said first probe sides at said free end of one of said probes, said ultrasonic test heads having acoustic directions directed towards each other, one of said ultrasonic test heads transmitting acoustic waves and the other of said ultrasonic test heads receiving the transmitted acoustic waves, a feeler disposed on one of said second probe sides, a roller connected to said feeler, means for bringing said roller into contact with a given region of the fuel assembly to be checked causing said probes to be moved closer together in the direction of the acoustic waves due to contact pressure with the fuel assembly, means for indicating and assessing movement of said probes by a reduction of transit time of the acoustic waves between said test heads, and means for deriving the actual dimension of the given fuel assembly region to be checked while accounting for dimensions of movement of said probes.

* * * * *